United States Patent
Liao et al.

(10) Patent No.: US 8,300,171 B2
(45) Date of Patent: Oct. 30, 2012

(54) REPAIRING STRUCTURE OF LIQUID CRYSTAL DISPLAY AND REPAIRING METHOD THEREOF

(75) Inventors: Dian-Gan Liao, Keelung (TW); Han-Tung Hsu, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 658 days.

(21) Appl. No.: 12/541,155

(22) Filed: Aug. 13, 2009

(65) Prior Publication Data
US 2010/0253870 A1 Oct. 7, 2010

(30) Foreign Application Priority Data
Apr. 7, 2009 (TW) .............................. 98111435 A

(51) Int. Cl.
G02F 1/1333 (2006.01)
G02F 1/1343 (2006.01)
G02F 1/13 (2006.01)

(52) U.S. Cl. .............................. 349/54; 349/55; 349/192

(58) Field of Classification Search ................... 349/54, 349/55, 192
See application file for complete search history.

(56) References Cited

U.S. PATENT DOCUMENTS

| | | | | |
|---|---|---|---|---|
| 5,367,392 | A * | 11/1994 | Janai | 349/55 |
| 5,995,178 | A * | 11/1999 | Fujikawa et al. | 349/55 |
| 6,429,909 | B1 * | 8/2002 | Kim et al. | 349/54 |
| 7,782,286 | B2 * | 8/2010 | Huang | 345/93 |
| 2001/0028418 | A1 * | 10/2001 | Ozaki et al. | 349/54 |

FOREIGN PATENT DOCUMENTS
TW 200710797 3/2007
* cited by examiner

Primary Examiner — Mike Qi
(74) Attorney, Agent, or Firm — Jianq Chyun IP Office

(57) ABSTRACT

A repairing structure of an LCD is provided, which includes at least a first conductive layer, an insulating layer located on the first conductive layer, at least a second conductive layer located on the insulating layer, and an opening located on the first conductive layer in a crossing region where the first conductive layer and the second conductive layer are overlapped. A repairing method of the repairing structure is further provided.

11 Claims, 5 Drawing Sheets

REPAIRING STRUCTURE OF LIQUID CRYSTAL DISPLAY AND REPAIRING METHOD THEREOF

CROSS-REFERENCE TO RELATED APPLICATION

This application claims the priority benefit of Taiwan application serial No. 98111435, filed on Apr. 7, 2009. The entirety of the above-mentioned patent application is hereby incorporated by reference herein and made a part of this specification.

BACKGROUND OF THE INVENTION

1. Field of the Invention

The present invention generally relates to a repairing structure and a repairing method thereof, in particular, to a repairing structure of a data line of a liquid crystal display (LCD) and a repairing method thereof.

2. Description of Related Art

A thin film transistor (TFT) LCD has advantages of low radiation and being light, thin, short, and small, such that it has been widely applied. Thanks to the characteristics of a high brightness and a wide viewing angle, the LCD is especially popular for high-level products. The TFT LCD is mainly formed by a TFT array substrate, a color filter array substrate, and an LC layer, in which the TFT array substrate is formed by a plurality of TFTs arranged in an array, and pixel electrodes respectively arranged corresponding to each TFT. The TFT serves as a switch element for an LCD unit. In addition, in order to control an individual pixel unit, a specific pixel is generally selected through a scan line and a data line, and the display data corresponding to the pixel is displayed by applying an appropriate operating voltage.

Since the display has been developed towards a technical trend of high definition and large size, people in this industry must fabricate increasingly longer signal transmission lines with increasingly fine line width and pixel size on an increasingly larger panel. Under this situation, the problem of non-uniform line width, or even line breaking problem unavoidably occurs when the substrate is fabricated, and what's worse, holes may be generated, which may result in a short circuit. During the fabricating process, defects of the line may be possibly generated due to certain faults or careless mistakes, and the breaking of signal lines may result in a line defect that the whole column of pixels fails to receive control signals, such that the definition of a display panel is rather poor and a production yield is reduced.

In order to solve the above problems, in a structure layout of a current TFT LCD, a plurality of annular repairing line structures is usually disposed around the array, which achieves a repairing effect through a laser welding manner, thereby increasing the yield of the panels and saving the fabrication cost. Referring to FIG. 1, when a data line 105 in a pixel region 130 is broken, a crossing region 109 between the data line 105 to be repaired and the repairing line 101 is dotted and welded by using the laser, so as to enable the data line 105 to be electrically connected to the repairing line 101, such that an electrical signal is delivered between the two wires. Particularly, during the repairing process, 4 welding points 110 around the crossing region 109 are selected to be repaired by using the laser, and a diameter range of the welding points 110 is approximately 3 μm-5 μm. However, the repairing method of the line defect still has disadvantages, for example, too many welding points exist, such that a repairing time is too long, and the welding points are too small, so that the resistance values at welding positions are rather large, and thus, the signal is attenuated to result in a poor repairing effect or repairing failure. Therefore, the present invention provides a repairing structure of a data line and a repairing method thereof to solve the above problems.

SUMMARY OF THE INVENTION

The prior art has problems about an excessively long repairing time and excessively large resistance values at welding positions, such that it is difficult to repairing the data line.

In order to solve the above problems, the present invention provides a repairing structure of an LCD, which includes at least a first conductive layer with an opening, an insulating layer located on the first conductive layer and covering the opening, at least a second conductive layer located on the insulating layer, and a crossing region located at a position where the first conductive layer and the second conductive layer are overlapped, in which the opening is located in the crossing region of the first conductive layer.

In the repairing structure, materials of the first conductive layer and the second conductive layer are selected to be different metals.

In the repairing structure of the LCD, the first conductive layer includes a repairing line.

In the repairing structure of the LCD, the second conductive layer includes a data line.

In the repairing structure of the LCD, the opening has a shape of round, oblong, square, or other geometrical shapes.

In the repairing structure of the LCD, at least one opening exists.

In the repairing structure of the LCD, a range of the opening is smaller than the crossing region of the two conductive layers.

In the repairing structure of the LCD, the opening design may increase a welding area between the two metal layers, so as to reduce the resistance value between the two metal layers.

A method of the repairing structure of the LCD includes the following steps.

In Step 1, a first conductive layer and a plurality of second conductive layers are provided, in which the first conductive layer spans across at least one of the second conductive layers.

In Step 2, a laser power is provided, in which at each crossing region between a defective second conductive layer and the first conductive layer, an insulating layer above an opening of the first conductive layer is penetrated by the laser power, such that the defective second conductive layer is electrically connected to the first conductive layer, so that an electrical signal is delivered between the two conductive layers.

In the method of the repairing structure of the LCD, opening regions at two ends of the defective second conductive layer need to be welded by the laser power.

In the method of the repairing structure of the LCD, one defective second conductive layer spans across at least two first conductive layers.

The repairing structure design can effectively reduce the resistance value between the two metal layers and increase the welding area, thereby improving the repairing yield, reducing the amount of repaired points, and saving the repairing time, which is much more advantageous than the conventional repairing technique.

In order to make the aforementioned and other objectives, features and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
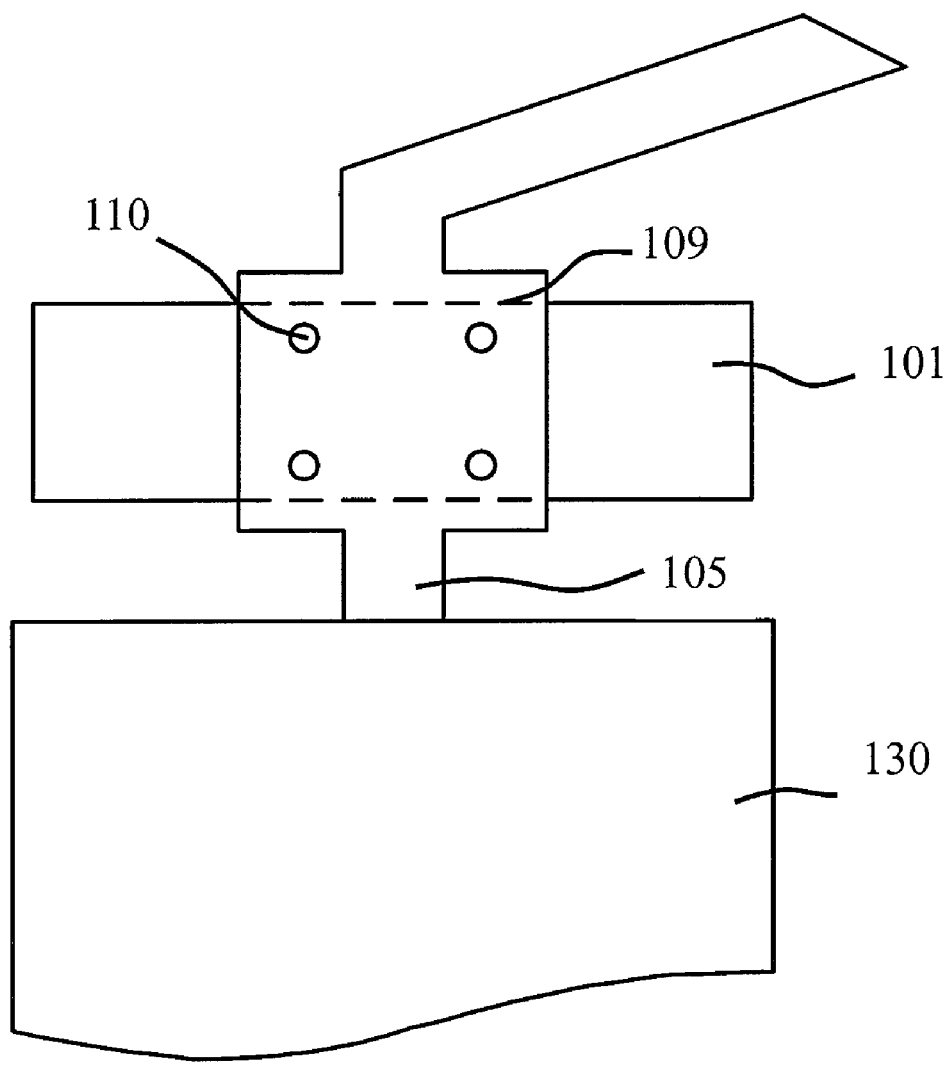
FIG. 1 is a schematic structural view of a repairing method of a data line of a display in the prior art.

Reference will now be made in detail to the present embodiments of the invention, examples of which are illustrated in the accompanying drawings. Wherever possible, the same reference numbers are used in the drawings and the description to refer to the same or like parts.

Figure 2:
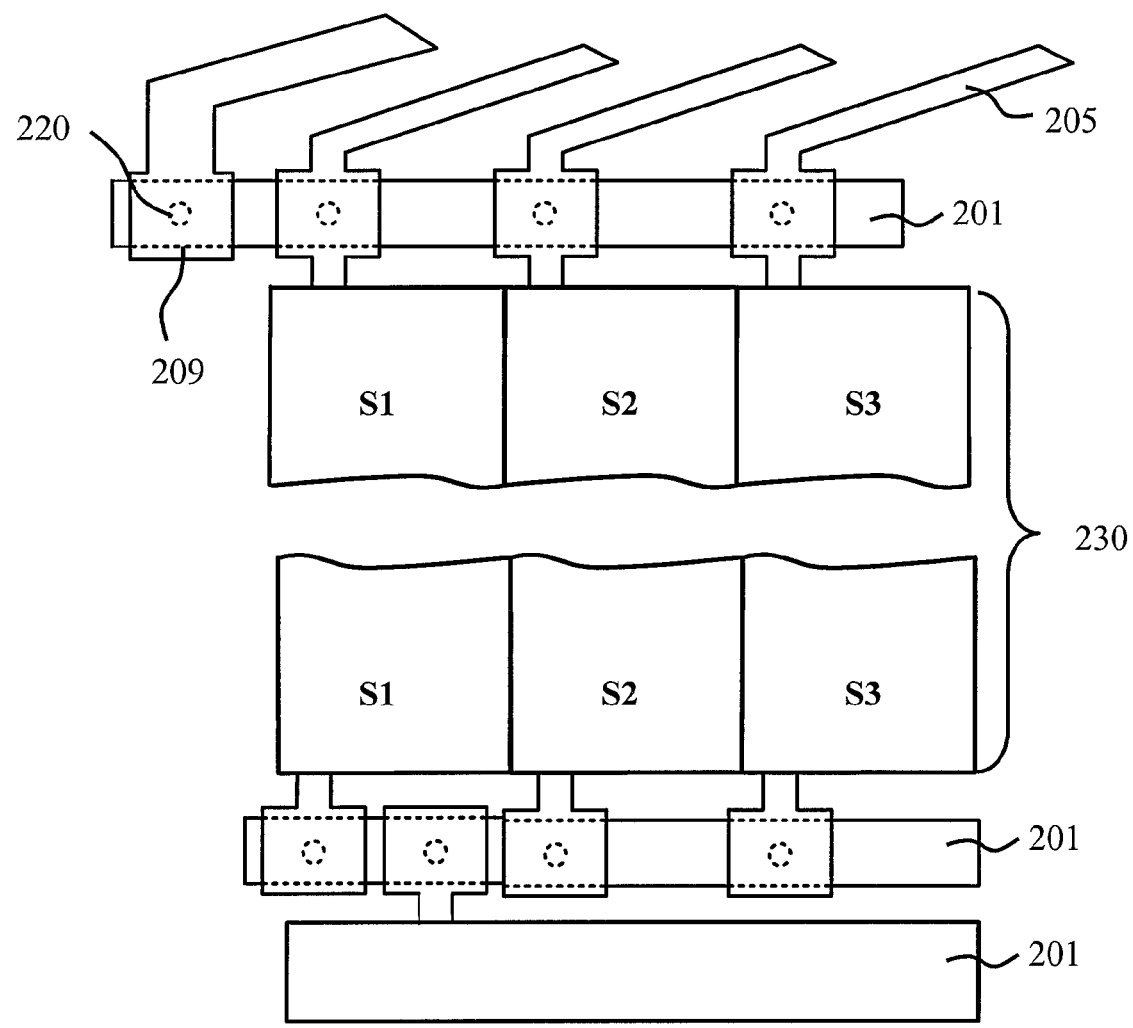
FIG. 2 is a schematic structural view of a repairing method of a data line of a display according to an embodiment of the present invention.

In the repairing method of an LCD, when a first conductive layer is a repairing line, and a second conductive layer is a data line, the method may be applied to repairing the defective data line. FIG. 2 is a schematic structural view of a repairing method of a data line of an LCD according to an embodiment of the present invention. Referring to FIG. 2, a display panel includes a plurality of data lines 205 and a plurality of repairing lines 201. The data lines 205 are connected to a pixel region 230. Each of the repairing lines 201 spans across at least one data line 205. The data line 205 and the corresponding repairing line 201 have a crossing region 209 where they are overlapped with each other, and a round opening 220 is designed at a central position of the repairing line 201.

Figure 3A:
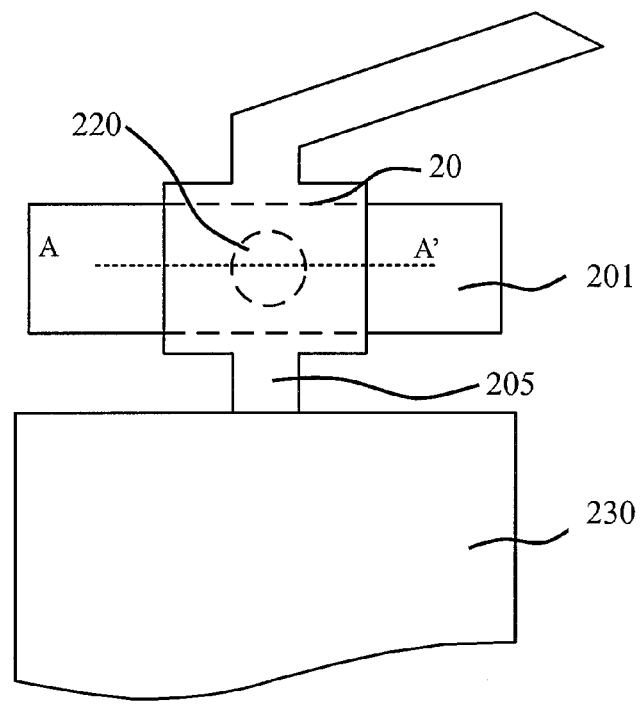
FIG. 3A is a partially enlarged view of a repairing structure of a data line of FIG. 2.
Figure 3B:
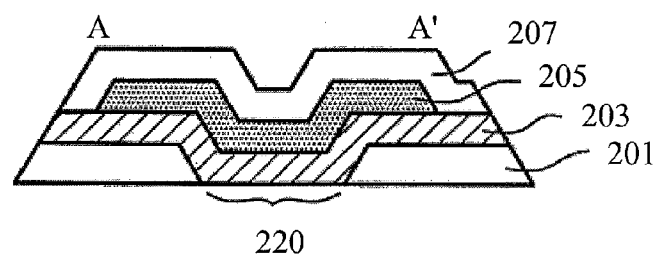
FIG. 3B is a schematic cross-sectional view of FIG. 3A, taken along a section line of A-A'.

FIG. 3A is a partially enlarged view of a repairing structure of a data line according to the above embodiment, and FIG. 3B is a schematic cross-sectional view of FIG. 3A, taken along a section line of A-A'. Referring to FIGS. 3A and 3B, the repairing structure of the data line includes: a repairing line 201 with an opening 220, an insulating layer 203 located on the repairing line 201 and covering the opening 220, a data line 205 located on the insulating layer 203, a protective layer 207 located on the data line 205, and a crossing region 209 located at a position where the repairing line 201 and the data line 205 are overlapped, in which the opening 220 is located on the crossing region 209 of the repairing line 201. When the insulating layer 203 above the opening 220 is penetrated, the repairing line 201 is electrically connected to the data line 205, such that an electrical signal is delivered between the two wire layers.

If the data line 205 in the pixel region 230 has certain defects, the data line 205 may be repaired by using the repairing structure. A laser power is provided, and at the crossing regions 209 between the defective data line 205 and the repairing lines 201 located on two ends thereof, the insulating layer 203 above the opening 220 of each repairing line 201 is penetrated by the laser power, such that the defective data line 205 is electrically connected to the repairing lines 201, and the electrical signal is delivered between the two conductive layers. Any defective data line 205 spans across at least two repairing lines 201, and the welding area is larger than that of the prior art, such that an impedance value at the position is reduced, and it is not necessary to weld four points at each repairing region, thereby greatly reducing the repairing time.

Figure 4:
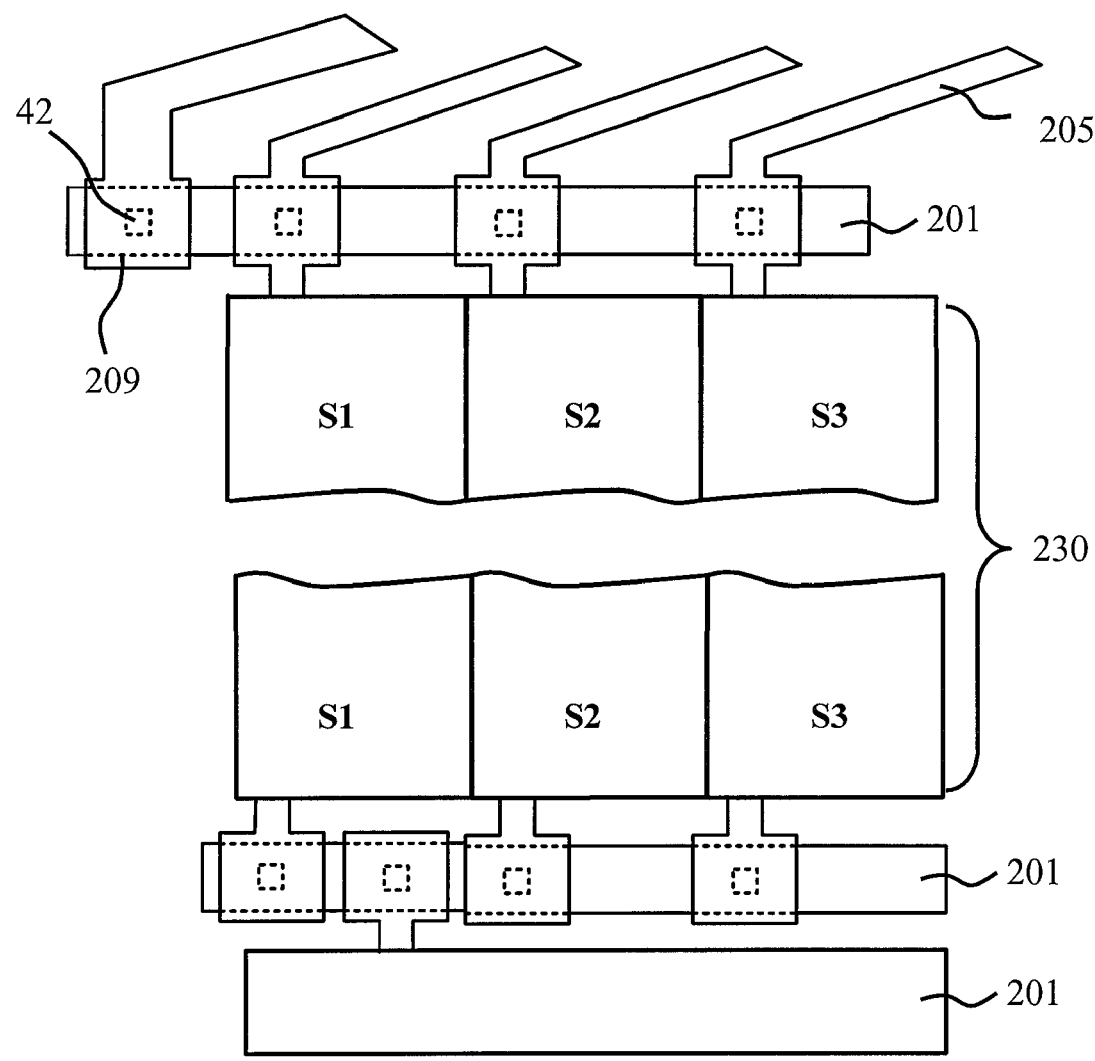
FIG. 4 is a schematic structural view of a repairing method of a data line of a display according to another embodiment of the present invention.

FIG. 4 is a schematic structural view of a repairing method of a data line of a display according to another embodiment of the present invention. Referring to FIG. 4, a display panel includes a plurality of data lines 205 and a plurality of repairing lines 201. The data lines 205 are connected to a pixel region 230. Each of the repairing lines 201 spans across at least one data line 205. The data line 205 and the corresponding repairing line 201 have a crossing region 209 where they are overlapped with each other. A square opening 420 is designed at a central position of the repairing line 201, which is used for laser melting when the defective data line 205 is repaired subsequently. Referring to FIGS. 3A and 3B, in the repairing structure, various patterns of the opening may be designed according to users' different demands.

Figure 5:
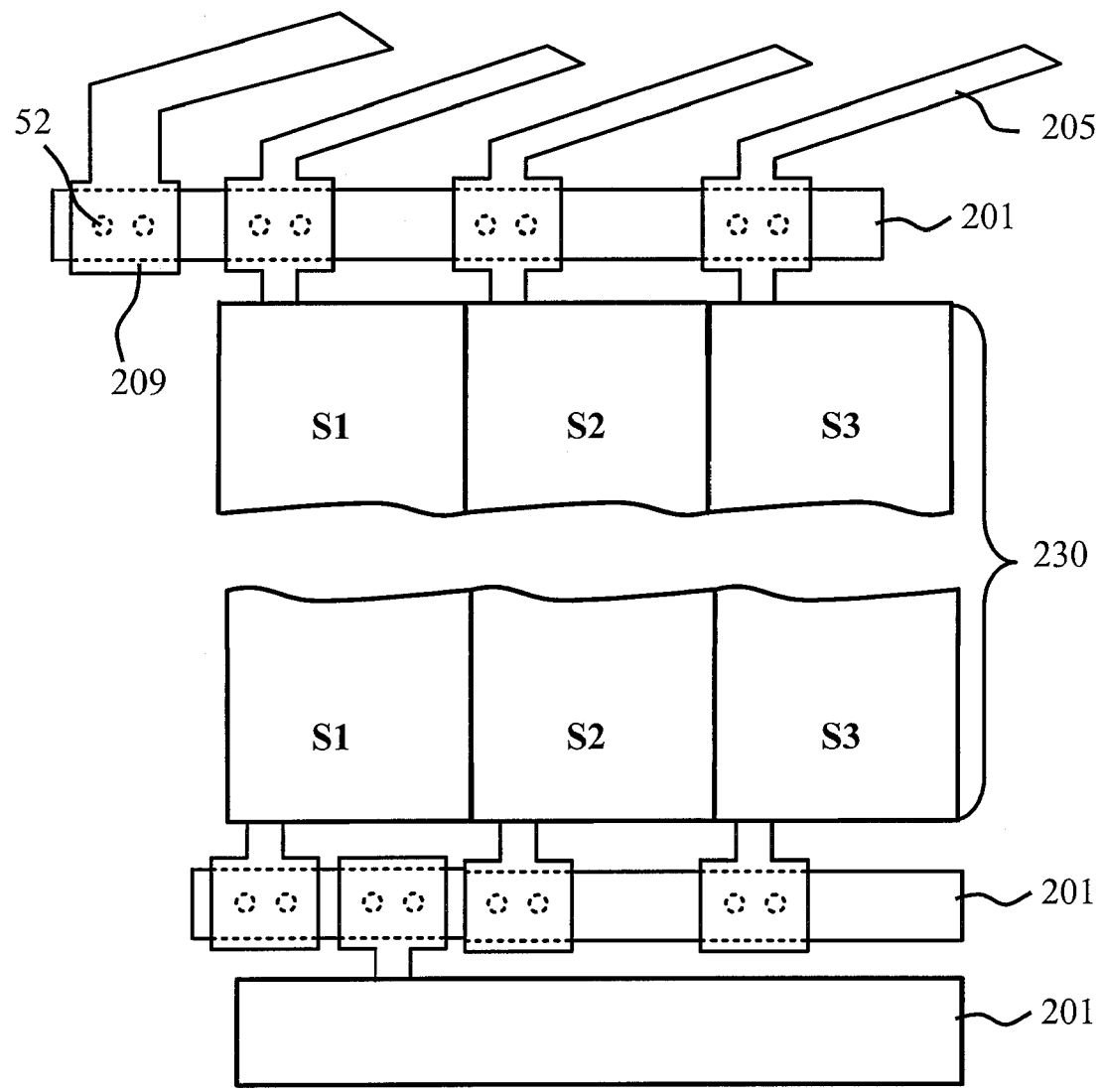
FIG. 5 is a schematic structural view of a repairing method of a data line of a display according to another embodiment of the present invention.

FIG. 5 is a schematic structural view of a repairing method of a data line of a display according to another embodiment of the present invention. Referring to FIG. 5, a display panel includes a plurality of data lines 205 and a plurality of repairing lines 201. The data lines 205 are connected to a pixel region 230. Each of the repairing lines 201 spans across at least one data line 205. The data line 205 and the corresponding repairing line 201 have a crossing region 209 where they are overlapped with each other. Two round openings 520 are designed at a central position of the repairing line 201, which are used for laser melting when the defective data line 205 is repaired subsequently. Referring to FIGS. 3A and 3B, such repairing structure mainly aims at preventing a repairing failure. If the welding fails for the first time, the remaining opening 520 can be still used for welding, thereby increasing the yield and lowering the cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A repairing structure of a liquid crystal display (LCD), comprising:
   at least a first conductive layer, comprising at least one opening completely surrounded by the first conductive layer;
   an insulating layer, located on the first conductive layer, and covering the opening;
   at least a second conductive layer, located on the insulating layer; and
   a crossing region, located at a position where the first conductive layer and the second conductive layer are overlapped, wherein the opening is located in the crossing region to serve as a repairing region.

2. The repairing structure of an LCD according to claim 1, wherein materials of the first conductive layer and the second conductive layer are selected to be different metals.

3. The repairing structure of an LCD according to claim 1, wherein the first conductive layer comprises a repairing line.

4. The repairing structure of an LCD according to claim 1, wherein the second conductive layer comprises a data line.

5. The repairing structure of an LCD according to claim 1, wherein the opening has a shape of round, oblong or square.

6. A repairing method of a liquid crystal display (LCD), comprising:

providing a first conductive layer and a plurality of second conductive layers, wherein the first conductive layer spans across at least one of the second conductive layer, and the at least one of the second conductive layer has at least a defective second conductive layer, wherein the first conductive layer comprises at least one opening completely surrounded by the first conductive layer; and providing a laser power, wherein at a crossing region between the defective second conductive layer and the first conductive layer, the opening is located in the crossing region to serve as a repairing region, and the insulating layer above the opening of the first conductive layer is penetrated by the laser power, such that the defective second conductive layer is electrically connected to the first conductive layer, and an electrical signal is delivered between the two conductive layers.

7. The repairing method of an LCD according to claim 6, wherein materials of the first conductive layer and the second conductive layer are selected to be different metals.

8. The repairing method of an LCD according to claim 6, wherein the first conductive layer comprises a repairing line.

9. The repairing method of an LCD according to claim 6, wherein the second conductive layer comprises a data line.

10. The repairing method of an LCD according to claim 6, wherein the crossing region at two ends of the defective second conductive layer is welded by the laser power.

11. The repairing method of an LCD according to claim 6, wherein one of the defective second conductive layers spans across at least two first conductive layers.

* * * * *